United States Patent

Gennari et al.

[11] Patent Number: 6,074,723
[45] Date of Patent: Jun. 13, 2000

[54] ROTATING MAT WITH HOLDING FLAPS, FOR SWITCHING MACHINES

[75] Inventors: Nedo Gennari, Genoa; Andrea Faure, Genoa Sampierdarena, both of Italy

[73] Assignee: Finmeccanica S.p.A., Rome, Italy

[21] Appl. No.: 09/064,152

[22] Filed: Apr. 22, 1998

[30] Foreign Application Priority Data

May 14, 1997 [IT] Italy ................................. MI970334 U

[51] Int. Cl.⁷ ........................................................ B32B 3/30
[52] U.S. Cl. ........................ 428/119; 198/459.1; 198/728; 198/732; 271/3.18; 428/120
[58] Field of Search .................................... 428/119, 120; 198/459.1, 732, 728; 271/3.18

[56] References Cited

U.S. PATENT DOCUMENTS 4,682,684  7/1987  Lothman ................................. 198/732

*Primary Examiner*—Nasser Ahmad
*Attorney, Agent, or Firm*—Young & Thompson

[57] ABSTRACT

A rotating mat for switching equipment, fitted with one or more holding flaps and elements capable of exerting a recalling force on the mat when the flaps are on the transmission rollers, wherein the elements which exert the recalling force are flexible elements attached to the mat's surface at the point of anchoring the flaps.

5 Claims, 1 Drawing Sheet

6,074,723

ROTATING MAT WITH HOLDING FLAPS, FOR SWITCHING MACHINES

FIELD OF THE INVENTION

The object relates to is a rotating mat equipped with holding flaps, destined in particular for switching machines of a type whereby a number of trolleys move along a path comprising one or more loading stations for objects to be switched to one or more unloading areas for the same, said trolleys each being fitted with a rotating mat which constitutes a loading and unloading plane for the objects.

BACKGROUND OF THE INVENTION

In these types of equipment, the objects appropriately coded according to their expected destination are automatically loaded on trolleys, which in passing the picking-up devices they are destined for, actuate the mat in a preprogrammed manner, to unload the object.

Equipment of this type is already known and has been described, for instance, in the patent application No. MI95A 001427, to which reference is made for further details. In many cases these small rotating mats are fitted with flaps which make it possible to prevent the carried objects from accidentally dropping off before the time of their delivery.

In combination with optoelectronic devices, these flaps may also function as sensors to verify for example the mat's proper operation, such as its rotation, etc. However, the presence of these flaps projecting from the surface of the mat requires the same to be properly positioned at the end of each unloading operation, to ensure that at the mat's standstill the flaps are always oriented toward the ends of the same, thus preventing it from interfering with the object being loaded.

The known technology envisions for this purpose the use of means capable of correcting the position of the flaps, if the same happen to get beyond the acceptable limit when the mat stops.

In particular, this includes the use of flaps in the form of projections extending from the mat's lower surface, so that if the latter stops when the flaps rest on the transmission rollers, the contact between the roller and the projection, which keeps the mat slightly lifted above the roller, induces an elastic stretching of the mat itself, and therefore a recalling force that tends to return, and therefore correct, the flap's position.

SUMMARY OF THE INVENTION

This system, however, has several drawbacks. For example, the mats made in this manner have a rather high production cost, require a greater force and the projections provided for correcting any misplacement of the flaps cause the equipment to vibrate. The purpose of this invention is to create an improved mat equipped with containing flaps.

This purpose is achieved by providing flaps having with a base made of a more rigid material than that of the mat itself and extending for a certain length of the mat, so as to develop an elastic recalling force provided by the base when the mat stops opposite the rollers, and to return it to its correct position.

Since the recalling force is no longer exerted by the mat but by an additional element (the base of the flaps), this element can be chosen to be of the most appropriate material to achieve the greatest recalling force, and consequently a better correction of the positioning errors.

Moreover, the mat according to the invention will be easier to produce with respect to the known types.

These and other characteristics are obtained by a mat according to the characterising portion of the attached claims.

BRIEF DESCRIPTION OF THE DRAWINGS

The mat as an object of this invention will now be described in detail, in form of a non-limiting example, with reference to the attached drawings in which.

DETAILED DESCRIPTION OF THE INVENTION

Figure 1:
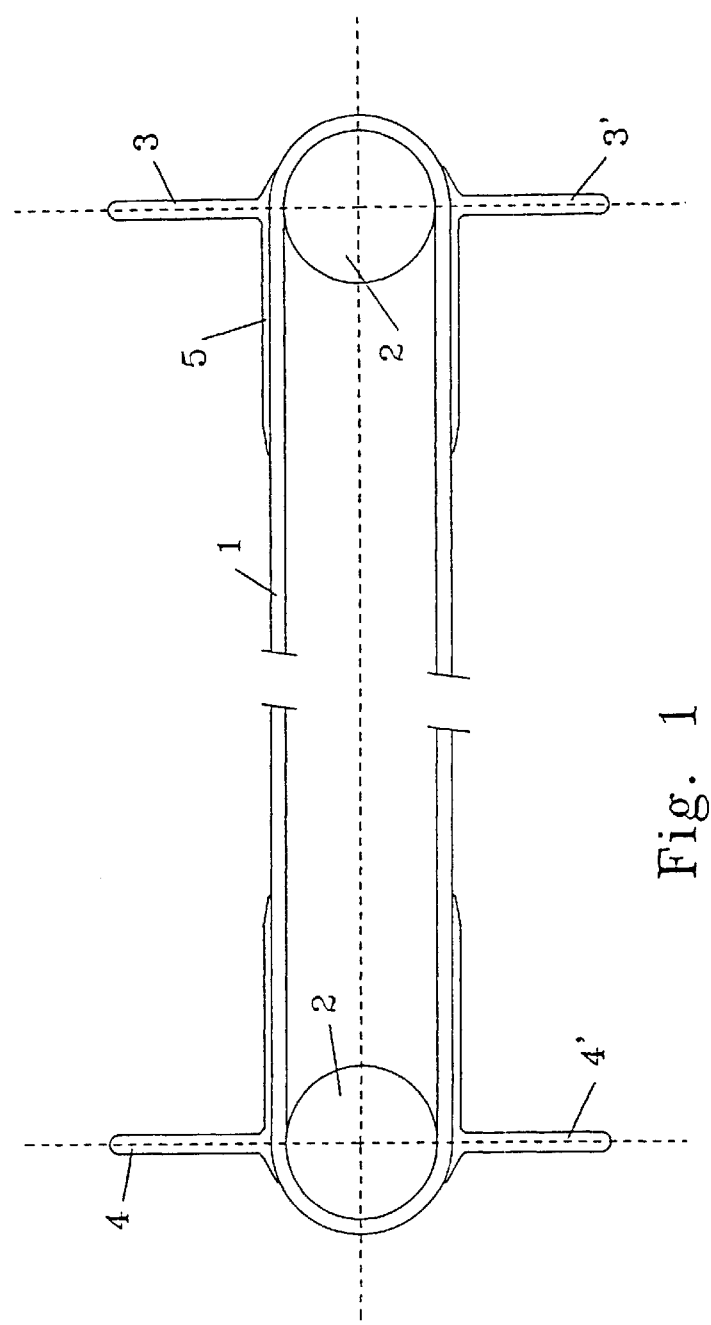
FIG. 1 is a simplified view of a rotating mat according to the invention.

The FIG. 1 shows a rotating mat mounted on a pair of rollers 2, connected to driving means of a known type.

The mat 1 constitutes, as mentioned, a plane for transporting and unloading the objects, which are placed on the mat and unloaded from the same by rotating the mat when it passes near the expected collecting devices.

The mat is provided with pairs of flaps 3, 3', 4 and 4', whereby each pair of flaps is positioned opposite one of the rollers 2, from diametrically opposite directions as shown in the figure.

A characteristic of the invention is that each flap is fitted with a base 5 extending for a certain width of the mat and built from a suitably rigid material to exert a force tending to oppose the flexing of the base 5 when passing the rollers 2.

For example, this base may, for mats having a carrying surface length of about 300 mm, have a width of 55 mm and a thickness of 1.5 mm.

The flaps 3 and the base 5 will preferably form a single body.

In particular, the flaps 3 will be arranged next to one end of these base elements 5, so that when the mat is in the correct position, as shown in the FIG. 1, with the base symmetrically arranged opposite the rollers 2, each base is oriented with its flap toward the inside of the plane formed by the mat itself.

As mentioned, it is important that the flexibility of the material forming the flaps 5 be lower than that of the material forming the mat 1.

Figure 2:
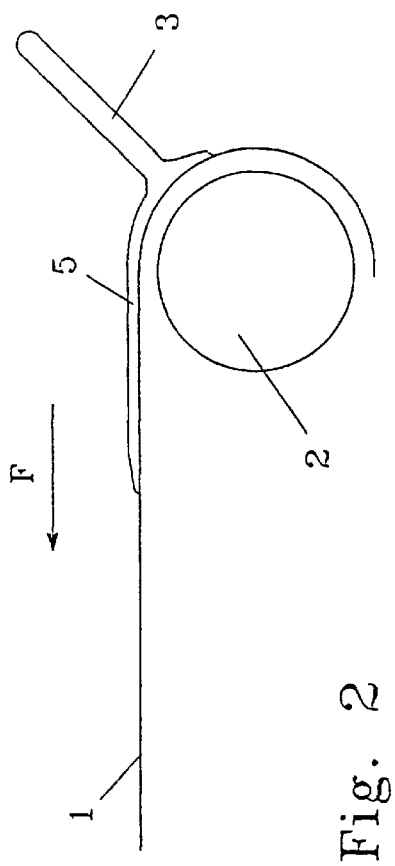
FIG. 2 is a simplified view of an enlarged detail of the rotating mat of FIG. 1.

In this manner, when the mat stops in a not "equilibrated" position, i.e. with the flaps in a position other than shown in the FIG. 1 and thus with a pair of base elements 5 bent backwards over the rollers 2 (as shown for example in the detail of FIG. 2), these bases act like a spring by exercising a recalling force F to return the mat to its proper position.

This produces a mat for switching machines having a simpler and more economical construction compared to those already known, marked by a particularly practical form of usage.

The dimensions, as well as the materials used, may vary depending on the specific requirements.

What is claimed is:

1. A mat for switching equipment, said mat being rotatable by transmission rollers, comprising:

a mat having an upper surface and an opposite roller engaging lower surface, said mat moving in a moving direction when moving between tandem rollers, said mat having a first degree of flexibility;

one or more flap element coupled to said mat, said flap element comprising (a) a base segment having a first surface coupled to said upper surface and an opposite second surface, and (b) a flap extending from said second surface, away from said mat, at a first angle relative to said moving direction when said flap is between said tandem rollers;

said base segment having a second degree of flexibility which is sufficiently less than said first degree of flexibility such that when said mat is not moving and said flap extends from said second surface at a second angle relative to said moving direction, said base segment will urge said mat in a direction until said flap extends from said second surface at said first angle.

2. The mat according to claim 1, wherein the flap is integral with the base segment.

3. The mat according to claim 1, wherein the flap is positioned next to an edge of the base segment.

4. The mat according to claim 1, wherein the flap segment has an inner edge and an outer edge, said inner edge being located closer to the center of the mat when said mat is not moving, and said flap being arranged near the outer edge.

5. The mat according to claim 1, further comprising a plurality of flap elements, each of the flap segments having an inner edge and an outer edge, each of the inner edges being located closer to the center of the mat when the mat is not moving, and each of said flap being arranged near a respective outer edge.

* * * * *